Figure 1:
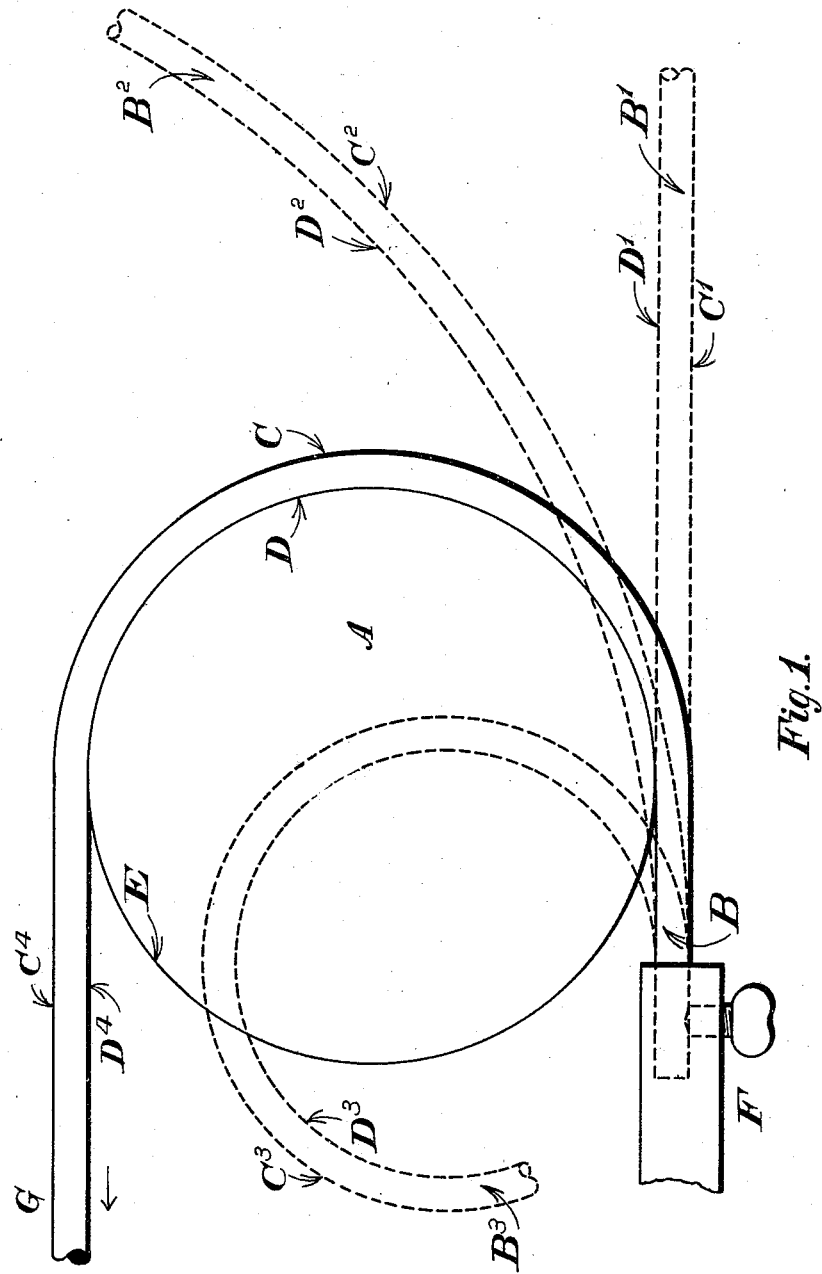

(No Model.)  2 Sheets—Sheet 1.

R. I. BROWN.
BELTING FOR TRANSMISSION OF POWER.

No. 543,124.  Patented July 23, 1895.

Witnesses:
Geo W Naylor Jr.
J. Freidel
C. Freidel

Inventor:
Rob I. Brown (No Model.) R. I. BROWN. 2 Sheets—Sheet 2.
BELTING FOR TRANSMISSION OF POWER.

No. 543,124. Patented July 23, 1895.

Witnesses:
Geo W Naylor Jr.
J. Freidel
C. Freidel

Inventor:
Rob't I. Brown

UNITED STATES PATENT OFFICE.

ROBERT I. BROWN, OF BROOKLYN, NEW YORK.

BELTING FOR TRANSMISSION OF POWER.

SPECIFICATION forming part of Letters Patent No. 543,124, dated July 23, 1895.

Application filed April 23, 1894. Serial No. 508,599. (No model.)

*To all whom it may concern:*

Be it known that I, ROBERT INGRAM BROWN, a citizen of the United States, residing at Brooklyn, county of Kings, and State of New York, have invented certain new and useful Improvements in the Use of Metallic Belting for the Transmission of Power, of which the following is a specification.

This invention relates to improvements in the use of metallic belting for the transmission of power; and the objects of the improvement are, first, to increase the durability of the belt; second, to reduce or remove the permanent stretching which is an objectionable feature in belts or ropes of wire as made heretofore, and, third, to make such belts applicable to wheels of smaller diameter than heretofore possible.

The previous universal practice in the use of metal bands for bending around wheels has been to make the belt as flexible as possible by the high internal mobility of its constituent parts, and the smaller the wheels around which it is to run the more internally mobile has it been sought to make the belt. As a consequence ropes have been made of a large number of wires, with the object that in bending the rope the wires shall slide longitudinally upon each other, so the parts of the rope on the inside of the bend have nearly equal tension with those on the outside of the bend, and there shall be no neutral axis, which neutral axis carries no strain, and to increase this internal mobility of the rope it is often carefully lubricated. Not only has this aim to attain the completest possible internal mobility of structure resulted in the making of ropes of many very fine wires, but it has also resulted in the application of the same principle to the internal structure of the individual wires, and they have heretofore been made so soft that they are ductile and some of their fibers permanently stretch or slide upon each other and set when bent around wheels. If the wire has set to a curve approaching that of the wheel, all its fibers were in considerable tension and there was no neutral axis while under the setting strain. If a wire is bent so its fibers slide or set upon each other when it is released, it will not return to its former condition; also, if a straight wire rope is bent sufficiently to slide the individual wires upon each other, when released the rope will not become straight again. Now, if the rope be pulled straight again the wires will slide back into their former positions without material alteration, except that due to their slight abrasion (which slightly but surely lengthens the rope) upon each other; but if the individual wire above mentioned be pulled straight again its fibers do not slide back to their former positions, but those least stretched in the first bending are now stretched most to make up the difference and the whole wire has become permanently elongated. This continual stretching of the fibers in the wire soon crystallizes the metal and makes it brittle, when it is either discarded or annealed to again fit it for the process of gradual stretching. Thus, as the rope and its constituent wires are continually elongating, a belt so made would soon become too loose to transmit power between ordinary wheels having their centers a fixed distance apart. There is little elasticity in such ropes or wires.

Believing that the direction formerly followed is erroneous, I proceed as far as possible in the opposite direction and, instead of annealing them till easily ductile, give the wires and their fibers the highest practicable elasticity by tempering—that is, I replace internal mobility in the wire by the elasticity of its hardened fibers, which spring back when released after being bent, and replace the internal mobility of the stranded rope by using wires not stranded or twisted together. These objects are obtained as described in the following specification, which will be more clearly understood by reference to the accompanying drawings, in which—

Figure 2:
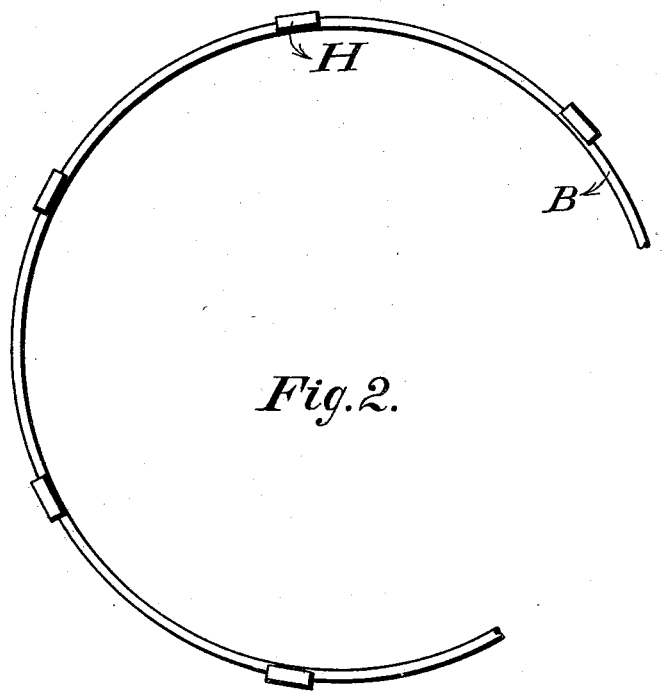
Figure 3:
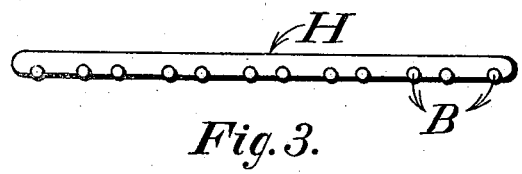

Figure 1 illustrates the special qualities which I have invented and applied to belts for power-transmission, and Figs. 2 and 3 illustrate the application of cross-bars to the belts for the purpose of engaging with sprockets or otherwise.

In Fig. 1 is shown the wire secured to the clamp F, which is immovably fastened, and the other end is strained at G in the direction of the arrow under a working strain of, say, one hundred pounds, the wire being tempered, as above mentioned, to withstand this strain when bent to a wheel of this diameter.

If the wire B is, before bending to the wheel A, straight, as shown at B′, the fibers at C′ and D′ are in their normal condition and under no strain. When simply bent around the wheel and under no strain at G the fibers of this tempered wire at D will be in compression and at C in tension, the neutral axis being about half-way between D and C. The fibers at $D^4$ and $C^4$ are under normal conditions. If this wire is soft and mobile when strain is applied its fibers at C will be the first to permanently stretch and slide upon each other, the wire becoming set. If sufficiently hard and immobile the fibers will not set or slide upon each other, but stretch only temporarily and return as soon as released. Properly tempered to remove internal mobility and proportioned to its work, no permanent stretch occurs in such a wire running around wheels, even of very small sizes, and therefore as there is no internal fatigue crystallization does not soon set in to shorten its running life. It will run indefinitely on wheels having centers at a fixed distance from each other without becoming loose, and attachments fixed to the wires, as illustrated in Figs. 2 and 3, at definite intervals are maintained at such intervals.

The temper given to the wire should not be so high as to make it brittle, but should in all cases be high enough to keep the wire from setting when in place on the wheel and subjected to its working strain.

In the tempered wire by applying, say, one hundred pounds working strain at G, the fibers at $D^4$ and $C^4$ are put in tension and elongate temporarily and equally, and there is no neutral axis at this straight part of the belt; but the tension at C is increased, causing these fibers to temporarily elongate, moving the neutral axis toward D, at which the compressive strain is diminished. If when the wire was simply bent to the wheel A it caused so much compression in the fibers at D that the one hundred pounds tension added at G has not been able to stretch the fibers at C enough to allow those at D to come into tension, then there would be a neutral axis between the fibers at D and C.

The fact of a neutral axis existing in the belt shows that all its parts are not doing the work they might be made to do, while other parts are loaded so as to quickly wear out. To overcome the use of idle material caused by the existence of a neutral axis two methods have heretofore been followed, one as above described, aiming at the highest internal mobility of the fibers in the wires and of the wires in the rope, the other being to use very large wheels, so there is little tendency to compress the inner part D, Fig. 1, of the rope or wire.

Having discarded the theory and practice of internal mobility in its structure, I adopt other means to keep the neutral axis out of the belt when it is to be used on small wheels. The following has proved amply satisfactory: Either before or after tempering, but preferably before, the belt or wire is given a permanent curvature of its own, as shown at $B^2$, Fig. 1, the fibers at $D^2$ and $C^2$ being now free of tension from external sources. Thus when the belt is bent to the wheel A there is much less compression of the fibers at $D^2$ and tension of those at $C^2$ when they are sprung to D and C, respectively. In this case when applying the one-hundred-pound strain at G, the fibers at C have still remaining in them temporary stretch or elasticity enough to bring those at D into tension and thus remove the neutral axis, which passes out from the side D. The strain at G will straighten the wire between G and the wheel, causing more tension on the fibers at $D^4$ than at $C^4$. Where the wire was bent to the wheel I have increased its ability to withstand external pull by removing the neutral axis, thus causing all the fibers to carry tension, and I have somewhat weakened the straight part of the wire by carrying most of the tension on one side $D^4$. It is possible to make a belt of such a natural curvature that on a given wheel the part bent to the wheel will have the same tension-carrying capacity as the straight part of the belt, and I thus have the maximum of total efficiency. Again, it is sometimes desirable that the belt should be stronger where bent to the wheel than where straight. In such a case the permanent curvature of the belt may be made to a very small radius, (even smaller than that of the wheel,) as shown at $B^3$, Fig. 1, in which case the fibers at $C^3$ would be in compression when simply bent to the wheel at C, and those at $D^3$ would be in tension at D. On applying the one-hundred-pound strain at G the neutral axis would pass toward C or out of the belt at C, throughout the part curved to the wheel, and the straightening of the wire from G to the wheel might throw the fibers at $C^4$ into compression, bringing a neutral axis into the belt where straight. This would leave the belt where bent to the wheel in the strongest possible condition, which is the important point in some elevators, conveyers, &c. Such a belt would hold very closely to the wheels, at high speeds even, and its grip to prevent slipping on the wheel would be very greatly increased.

In Figs. 2 and 3 the wires B are united at intervals along their length by cross-bars or clamps H. The manner of securing these clamps to the wires is immaterial to this application. When such a belt is to be used in conjunction with sprocket-wheels it is of the utmost importance that the pitch of or distance between the cross-bars H shall not vary or increase. Consequently any stretch in the wire here is very damaging, and this can only be avoided by the improvements herein described.

Having thus described my invention, what I claim as new, and desire to secure by Letters Patent, is—

1. A metal band for the transmission of power composed of two or more parallel tension members united at intervals and adapted to ride directly on wheels, which band has a permanent curvature of its own more nearly equalizing the strains in the part curved to the wheel with the strains in the part not curved to the wheel.

2. A metal band for the transmission of power composed of two or more parallel tension members united at intervals and adapted to ride directly on wheels, which band has a permanent curvature of its own facilitating the removal of the neutral axis when bent to a wheel and strained.

3. A band for the transmission of power, composed of metal having a spring temper, and which is free from internal longitudinal mobility and ductility, and having a permanent curvature of its own assisting in the removal of the neutral axis when bent to a wheel and strained.

4. A band for the transmission of power, composed of two or more parallel tension members united at intervals, which band has a permanent curvature of its own on a radius not greater than that of a wheel on which it is to run.

ROBT. I. BROWN.

Witnesses:
WM. A. COURTLAND,
J. GREEN.